March 16, 1943.  E. W. VREDENBURG  2,314,299
WEIGHING MECHANISM
Filed Sept. 26, 1939    2 Sheets-Sheet 1
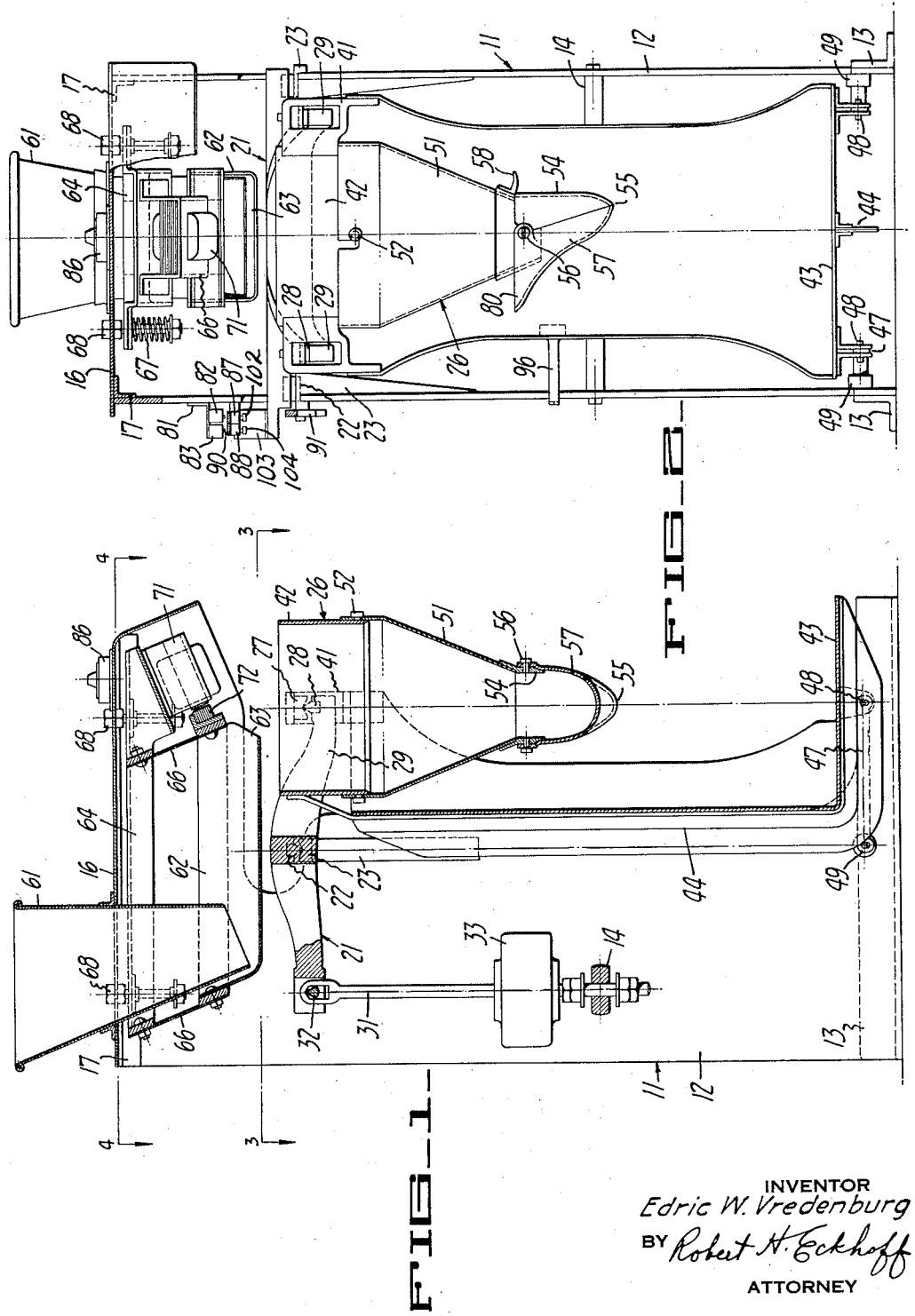
INVENTOR
Edric W. Vredenburg
BY Robert H. Eckhoff
ATTORNEY March 16, 1943.   E. W. VREDENBURG   2,314,299
WEIGHING MECHANISM
Filed Sept. 26, 1939   2 Sheets-Sheet 2
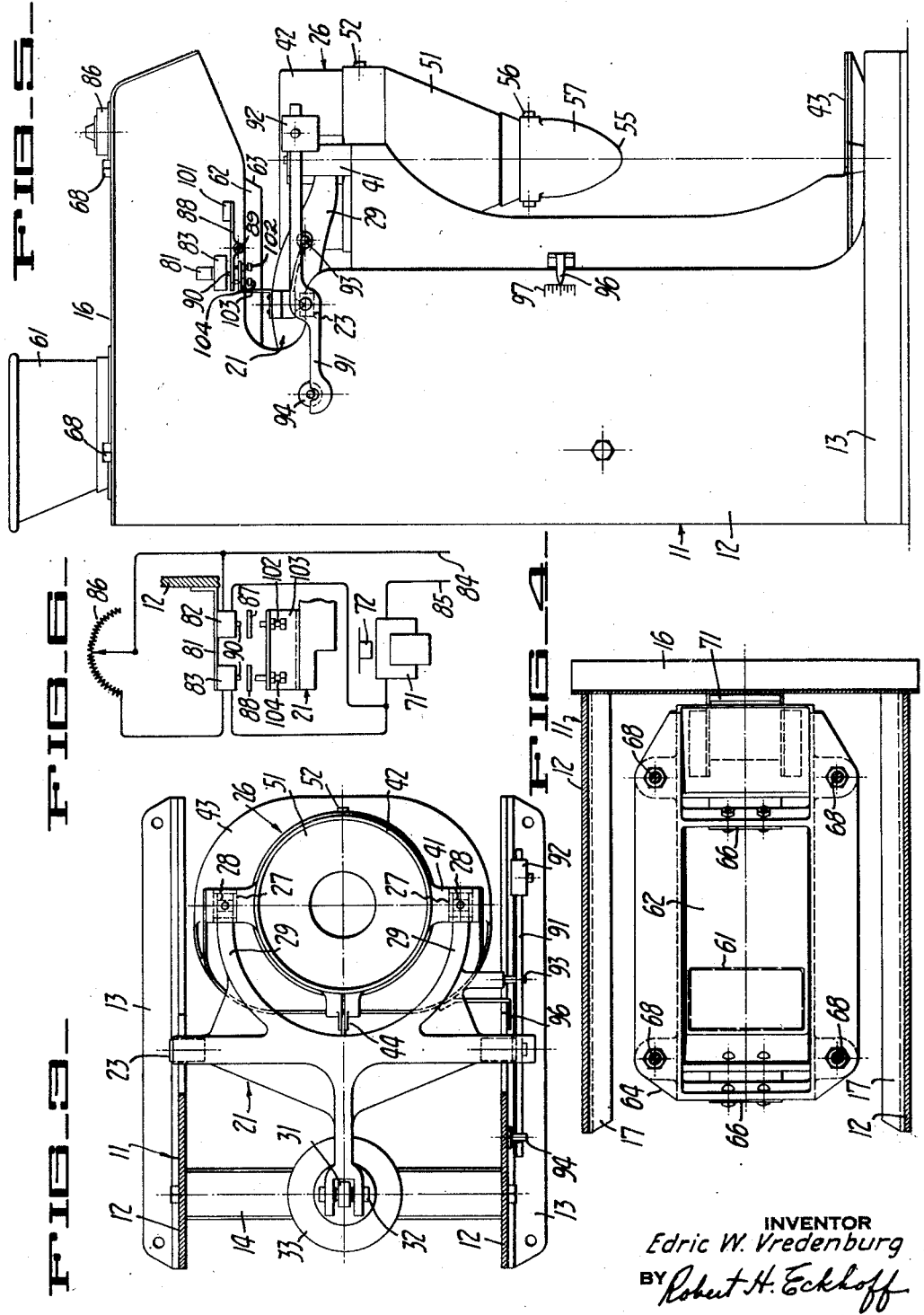
INVENTOR
Edric W. Vredenburg
BY Robert H. Eckhoff
ATTORNEY Patented Mar. 16, 1943

2,314,299

UNITED STATES PATENT OFFICE 2,314,299

WEIGHING MECHANISM

Edric W. Vredenburg, Oakland, Calif.

Application September 26, 1939, Serial No. 296,579

2 Claims. (Cl. 249—42)

This invention relates to a weighing mechanism, particularly one to weigh out a batch of material of a predetermined weight. In the marketing of various materials as sugar, salt, flour, coffee, candy, beans, and in fact any relatively dry free flowing material marketed in packages, the problem of providing a batch of material of a predetermined weight is present. The device of the present invention enables batches of a selected weight to be weighed out accurately and rapidly. The device of the present invention is characterized by its accuracy, simplicity, ease of construction, ruggedness, low first cost and low operating cost.

In addition to the foregoing, the invention includes other objects and features of advantage, some of which, together with the foregoing, will appear hereinafter wherein the present preferred form of the device is disclosed.

In the drawings accompanying and forming a part hereof, Figure 1 is a side elevation partly in section through the present preferred form of device embodying this invention.

Figure 2 is an end elevation of the device shown in Figure 1.

Figure 3 and Figure 4 are respectively sections taken along the lines 3—3 and 4—4 of Figure 1.

Figure 5 is a side elevation of the device shown in Figure 1.

Figure 6 is a circuit diagram illustrating the preferred form of the invention.

The frame

The mechanism of the present invention is supported in a suitable frame indicated generally by numeral 11. This frame is made up of side plates 12 suitably secured together and having angle iron strips 13 secured at the bottom thereof to provide a suitable base. A cross brace 14 is positioned between the side plates 12 to stiffen the frame, while a top plate 16 is secured across the top of the side plates 12 and is suitably braced by angle plates 17.

The weighing mechanism

As appears in Figures 1, 2 and 3, I have shown as typical weighing mechanism a lever in the form of a frame 21 having knife edges 22 at opposite sides thereof supported in suitable bearing blocks 23, the knife edges being intermediate the ends of the frame. At one end of the frame a material receiving means generally indicated at 26 is provided, the receiving means including oppositely positioned pivot blocks 27 engaged with knife edges 28 on opposite arms 29 of the frame. At the other end of the frame a rod 31 depends from knife edge 32. Suitable movable weights 33 are carried upon the rod to counter-balance the hopper or other material receiving means 26.

The weighing mechanism disclosed is that presently preferred for the weighing out of material. However, in the broadest aspects of the invention, it is merely typical of any suitable weighing mechanism. That disclosed in my Patent 2,112,977 of April 5, 1938 can be employed, for example, if desired, as can other suitable receiving and weighing mechanism.

Material receiving means

The pivot blocks 27 which support the material receiving means 26 on the knife edges 28 are carried upon opposite sides of a suitable frame 41. This frame includes a tubular member 42 which defines a receiving chute or conduit for material to be weighed, as will appear in further detail hereinafter. Secured to member 42, and in a cooperative relationship therewith, is a receptacle filling and support platform 43 provided by a suitably formed arcuate sheet metal member secured to the member 42 and suitably braced by T-member 44. Platform 43 supports a bag, sack, box or bottle to be filled.

To guide the platform 43 and maintain it in position during weighing operations, links 47 are suitably pivoted on the platform as at 48 and on the frame 11 as at 49. The link extends between the frame along the center line of the knife edges 22 and the supports 23 therefor so that a parallel linkage is provided to support and guide the platform 43 for movement with the weighing frame 21.

The hopper

If desired, a suitable chute or feed mechanism can be attached to the tubular member 42. I have shown a funnel like member 51 secured to member 42 as by the bayonet connection indicated generally at 52. The funnel 51 is preferably employed when bags of paper or Cellophane are to be filled because these are relatively difficult to open. The size and shape of the funnel or filling spout can be varied to suit the product, or the funnel can be omitted and the device to be filled supported on platform 43 or on member 42 or both.

In accordance with this invention, over the end of the funnel member a first fixed closure member 54 is secured. Cooperating with this and hinged as at 56 is a cooperating closure member 57 movable toward and away from member 54 to retain or release material carried in the funnel 51. The member 57 is so fashioned that it is retained in its closed position by its own weight acting around hinge point 56. Members 57 and 54 are arcuate in shape, spreading outwardly from the bottom lips 55 toward the upper edge 60 so that, upon inserting lips 55 between the opposite sides of a bag, the bag is opened as it is raised. An operator is thus able to place and fill a bag rapidly. The arcuate shape of this filling spout enables an operator to place a bag quickly. When member 57 is moved the material discharges readily into the bag. During the filling operation the operator's finger on one hand is engaged with the rest 58 on the side of the funnel so that the scale is retained in position during discharge of the material from the hopper 51. The other hand engages projecting side 60 on member 57 to move it and release the weighed batch.

The feed mechanism

In accordance with this invention, means are provided for feeding material into the weighing mechanism and, in accordance with this invention, the feed is so arranged that the amount of material fed into the weighing mechanism is accurately controlled. Further, the feed is made directly from a large batch of the material to be weighed so that very rapid operation is possible.

The feeding mechanism is shown in the drawings as including a supply hopper generally indicated at 61. While this hopper is shown as a relatively small structure, it can be made very large, and can be in direct communication with a large supply of the material to be weighed. The hopper 61 is supported upon the top plate 16 and extended therethrough to discharge on to a feeding trough 62. This trough is closed at one end and has an open discharge end as at 63 over which material is discharged directly into the receiving means 26. The feed trough 62 is supported from a suitable frame generally indicated at 64 by resilient strips 66 secured to the frame 64 and to the feed trough. The supporting frame 64 is suitably secured in position on springs 67 carried by bolts 68 depending from the top plate 16. Usually feed trough 62 is adjusted by bolts 68 so as to be horizontal. With some materials the trough should be inclined upwardly to its discharge lip and with others it should be inclined downwardly. The bolts enable this angle to be changed readily, depending on the material being weighed out. Hopper 61 is readily removable so it and the other scale portions can be cleaned readily.

Mounted upon the frame 64 is an electromagnet vibrator structure generally indicated at 71. Devices of this character are well known in the art and various forms thereof can be employed. The vibrator cooperates with the magnetic mass 72 secured to the feed trough 62 whereby the feed trough is rapidly vibrated to feed material along its surface and over discharge lip 63.

In accordance with this invention, operation of the vibrating mechanism 71 is under the control of the weighing mechanism. Thus, as appears particularly in Figures 2 and 5, I mount a bracket 81 upon one of the side plates and on this bracket I mount a first electric switch structure generally indicated at 82. These switch structures can be any one of the electrical switches operating upon very small movement of a control element such as that switch shown in Patent 1,960,020 of May 22, 1934 and sold by the Micro-Switch Corporation under the trade-mark Micro Switch. If desired, but one switch need be employed and this can be so positioned with respect to the frame 21 that, as will presently appear, upon a very slight downward movement of the frame 21, as upon discharge of material, the operation of the electro-magnet 71 is shut off and further feeding of material discontinued.

The secondary feed

I prefer to employ a secondary feed control means because I have found that this enables the feeding of certain types of material to be controlled accurately. I therefore prefer to employ two switches and, as appears in Figure 5 (see the wiring diagram in Figure 6), I have shown a second switch 83 mounted on the bracket 81.

Typically, switches 82 and 83 can be connected, as appears in Figure 6, to a suitable source of alternating current such as that provided by lines 84 and 85. Switch 82 is shown connected directly to these lines and to the electrical vibrating mechanism 71. I have found it desirable, when the weighing mechanism has moved downward slightly, that the rate of vibration be decreased so that the rate of feed be diminished. I therefore prefer to insert in the circuit including switch 83 a suitable current control mechanism such as a rheostat indicated at 86. This rheostat is conveniently mounted upon the top plate 16 so an operator can adjust the final feed rate or secondary feed rate. Thus, in operation, when the weighing frame 21 is in its raised position and is free of material, switches 82 and 83 will be closed. Upon material being present in the feed trough 62, and current being supplied to the electrical vibrator 71, material is discharged at the primary rate. As the weighing frame moves down switch 82 will be opened and thereupon the vibration rate will be decreased under the control of switch 83 and rheostat 86. As the frame continues to move downward the switch 83 will open and positive secondary feed will be cut off entirely.

The switch operating means

Means are provided for reducing the effect exerted by the weighing mechanism to open each switch. This means includes lever 87 and lever 88 pivotally mounted on side plate 12 as at 89 intermediate the lever ends. One end of each lever engages switch operator 90 while the other end carries a removable, adjustable weight 101. Lever 87 is engaged by adjusting screw 102 on weighing frame extension 103 while lever 88 is engaged by adjusting screw 104 on the extension 103. It is to be noted that screw 102 engages lever 87 after screw 104 engages lever 88. This ensures that switch 82 opens before switch 83. Although switch 83 closes first, this is not critical for switch 82 closes so soon afterward because the weighing frame is moving so rapidly to filling position. The weighing frame moves downwardly more slowly than upwardly.

The mechanical secondary feed means

In place of employing a second switch, one can artificially and falsely load the weighing mechanism during the initial portion of its downward movement. This is accomplished by mounting a lever 91 upon the side of the weighing frame so that it is supported co-axially with the pivot of knife blades 22 and pivot blocks 23. The lever carries an adjustable weight 92 thereon which normally maintains the lever 91 in engagement with a stop 93 on the side of frame 21. When the weighing frame is in its raised position, lever 91 will be in engagement with stop 93 and, upon discharge of material into the hopper or the platform carried by the frame 21, the weight of the frame will be temporarily increased by the added wieght 92. However, continued movement of the frame brings the lever 91 into engagement with the stop 94. When thus freed of the weight 92, the weighing mechanism acts independently thereof. By adjusting the position of the weight 92 on the lever 91, the feed from trough 62 can be made to cut off so accurately that one batch will have the same weight as any other batch. The vibrating means vibrates the trough for a short time even after it is deenergized so that feeding continues but at a materially reduced rate. The period of the first and the secondary vibration is controlled by adjusting weight 92.

The visual weight check

The weighing mechanism and feeding mechanism of the present invention possesses a further advantage in that it enables the operator to instantly visually check the weight delivered. This is accomplished by pointer 96 cooperating with scale 97 mounted on one of the side plates (Figure 5), so an operator can instantly observe whether or not each batch is over or under weight.

I claim:

1. In a device of the class described, means for receiving a batch of a material, a lever, means oscillatably supporting said lever intermediate its end with said receiving means at one end thereof, counter weight means for said receiving means and said batch of material carried at the other end of said lever, material supply means, a conduit receiving material from said supply means and including a portion extending substantially horizontally adjacent an end whereat material is discharged into said receiving means, electrical vibrating means operable at different rates, means supporting said conduit for at least a limited degree of free motion, electrical circuit including said vibrating means for vibrating said conduit rapidly and at a first rate to move material therein over and off said conduit end into said receiving means, another electrical circuit including said vibrating means for vibrating said conduit rapidly but at a rate less than said first rate to discharge material over and off said conduit end into said receiving means, a plurality of switch means for controlling selectively energization of each of said circuits and operation of said electrical vibrator means, each switch means being fixed in position cooperatively adjacent to said lever support means and having only a limited free movement between open and closed position to control said vibrating means, and a motion transmitting lever system operated by oscillation of said lever to transmit to only a reduced extent to said switch means motion of said lever.

2. In combination, a support structure, weighing mechanism including an oscillatably supported lever mounted on said support structure, means for feeding material to be weighed to said weighing mechanism including a trough suspended for vibration from said support structure, electrical vibrating means secured on said support structure, a micro-switch controlling operation of said electrical vibrating means, said switch having an operating element and being fixed in a position substantially in vertical alignment with and closely adjacent to the pivot of said supported lever, a switch operating lever engaged adjacent one end with said element and pivotally supported intermediate its ends, and an arm extending from said weighing mechanism lever immediately adjacent to the point of oscillation support therefore and engaging said switch operating lever between its ends to reduce the extent of motion of said element.

EDRIC W. VREDENBURG.